United States Patent Office.

DESMOND GERALD FITZ-GERALD, OF BRIXTON, COUNTY OF SURREY, AND THOMAS JOHN JONES, OF PRINCES STREET, HANOVER SQUARE, COUNTY OF MIDDLESEX, ASSIGNORS TO THE PRIMARY BATTERY COMPANY, (LIMITED,) OF HANOVER SQUARE, LONDON, W., ENGLAND.

VOLTAIC BATTERY.

SPECIFICATION forming part of Letters Patent No. 333,292, dated December 29, 1885.

Application filed December 26, 1884. Serial No. 151,190. (No specimens.) Patented in England December 11, 1884, No. 16,276; in France December 16, 1884, No. 165,965; in Belgium December 17, 1884, No. 67,257; in Germany February 1, 1885, and in Italy June 30, 1885, XIX, 18,504, XXXVI, 404.

*To all whom it may concern:*

Be it known that we, DESMOND GERALD FITZ-GERALD, of Brixton, in the county of Surrey, England, electrician, and THOMAS JOHN JONES, of Princes Street, Hanover Square, in the county of Middlesex, England, electrician, have invented a new and useful Improvement in Voltaic Batteries, of which the following is a full, clear, and exact description.

Our invention consists in improvements in the construction of negative elements of voltaic batteries, more especially those in which peroxide of lead is employed as the "depolarizing agent." We have found this substance to be most efficacious for the purpose in view provided means be taken to obviate the production of a "local couple," caused by contact between the peroxide, an oxidizable support, and the electrolyte. When, however, such triple contact exists, the peroxide of lead may be almost or quite inefficacious as a depolarizing agent. When, for instance, a simple plate of lead in contact with peroxide of lead and dilute sulphuric acid is employed as the negative element of a voltaic couple, the electro-motive force of the couple rapidly fails, while its internal resistance increases, so that the couple becomes almost inoperative, whatever may be the metal employed as the positive element of the couple. The cause of this failure is to be found in the local voltaic action which occurs between the oxidizable lead and the oxidizing peroxide in presence of sulphuric acid, whereby the surface of the lead becomes coated with a layer of sulphate of lead, which effectually prevents contact between the metal and the oxidant. This local action may be prevented by the use of gold or platinum, or greatly reduced by the use of carbon as the support for the active material, as is well understood. According to our invention, however, we employ as the support for the depolarizing agent, a conductor—such as a plate of lead or silver—which is itself susceptible of oxidation, but which we coat with a first or superficial but dense coating of peroxide of lead, which is preferably rendered impervious by means of a suitable non-conducting substance, such as paraffine-wax, (which should be free from stearic acid,) while permitting contact of the depolarizing agent with such first coating. Such a conductor becomes equivalent for the purpose in view to a plate of gold or platinum, insomuch as this first impervious or nearly impervious layer of peroxide constitutes an inoxidizable conductor which protects the oxidizable conductor from contact with the electrolyte, and thus obviates local action.

In carrying out our invention, we first obtain a superficial layer of peroxide of lead upon the surface of any suitable rigid conductor of oxidizable metal or of carbon, preferably by making such conductor the anode within an electrolyte composed, for instance, of a solution of oxide of lead in caustic alkali, the peroxide being allowed to deposit very slowly. The first superficial layer thus obtained may advantageously be burnished or subjected to pressure between smooth plates or rollers. It may then be supplemented by a second thin coating of peroxide of lead. Other electrolytes—such as a solution of lead nitrate, dilute sulphuric acid, or a solution of sulphate of magnesia—may be employed. When, however, the acid or the sulphate solution (or any electrolyte which does not contain lead) is used, the conductor must be lead. The plate must in this case be maintained in the electrolyte until oxygen is evolved from its surface, when it should be removed, washed with water, dried, and pressed or burnished. It should then be returned to the electrolyte until oxygen is again evolved from its surface, when it is washed and dried a second time. The conductor thus coated with inoxidizable conducting material may now be more completely protected from contact with the electrolyte when in use by immersing it in melted paraffine-wax (or similar waterproofing substance) until the layer of peroxide of lead is saturated with this material. The latter, when cold, is carefully removed by means of a scraper or other suitable tool from the surface of the plate, so as to expose the conducting peroxide of lead, of which the pores will remain filled with the paraffine.

The prepared plate, when used, may be immersed in a pasty mass of peroxide of lead with water, a solution of sulphate of magnesia, or other suitable fluid, such pasty mass alone or in admixture with carbon fragments being contained within a porous receptacle; or this receptacle may be dispensed with and the prepared conductor may be utilized as a support for a comparatively thick and porous layer of peroxide of lead obtained by any of the known means alone or in admixture with carbon fragments. In this case the element may be wrapped in canvas, felt, or other suitable porous material.

Instead of surrounding the inoxidizable support with peroxide of lead itself, said support may be coated with a pasty mass containing lead, to be subsequently converted by electrolysis into peroxide of lead. For instance, we may coat the inoxidizable conductor or support with a pasty mass of oxide of lead in admixture with finely-divided lead, (in the proportion of from one part of the latter to three or four parts of the former,) and then convert this mixture into peroxide of lead by rendering the coated support the anode in a suitable electrolyte, preferably a solution of sulphate of magnesia.

The negative elements of our invention may be employed in conjunction with any suitable positive element and electrolyte, such as a plate of amalgamated zinc or of porous lead in dilute sulphuric acid. They may also be used as elements in secondary batteries.

Although we have described the electrolytic method as the one we prefer for producing on the surface of the conductive support the protective layer of peroxide of lead, we do not limit ourselves thereto, as the support may be coated mechanically with any sufficiently pure peroxide of lead, such as that obtained in bulk by electrolysis or by treating red lead with nitric acid.

Having now particularly described and ascertained the nature of the said invention and in what manner the same is to be performed, we declare that what we claim is—

1. In a negative element for voltaic batteries, the combination, with the conductive support and the depolarizing agent, of a water-proof layer containing peroxide of lead interposed between said conductive support and the depolarizing agent, and being in contact on the one hand with the said support and on the other hand with the depolarizing agent, substantially as specified.

2. The herein-described method of producing a negative element of a voltaic battery, consisting in the electrolytic production upon the surface of a plate of lead or other suitable conductor of a coat or layer of peroxide of lead, then rendering the same impervious to the electrolyte by the application of paraffine-wax, (or other equivalent waterproofing material,) then partially removing the waterproof coating, so that the pores or interstices of the coating or layer of peroxide of lead will be left filled and its surface exposed, and finally applying the depolarizing agent in contact with the said coating or layer, substantially as specified.

The foregoing specification of our improvement in voltaic batteries signed by us this 10th day of December, 1884.

DESMOND GERALD FITZ-GERALD.
THOMAS JOHN JONES.

Witnesses to the signature of Thomas John Jones:
    J. WATT,
    JOHN DEAN,
        *Both of 17 Gracechurch St., London.*

Witnesses to the signature of Desmond Gerald Fitz-Gerald:
    J. WATT,
    HERBERT E. DALE,
        *Both of 17 Gracechurch St., London.*